United States Patent
Li et al.

(10) Patent No.: US 8,789,058 B2
(45) Date of Patent: Jul. 22, 2014

(54) SYSTEM AND METHOD FOR SUPPORTING BATCH JOB MANAGEMENT IN A DISTRIBUTED TRANSACTION SYSTEM

(75) Inventors: Jared Li, Beijing (CN); Yu Wang, Beijing (CN); Wei Chen, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 276 days.

(21) Appl. No.: 13/072,537

(22) Filed: Mar. 25, 2011

(65) Prior Publication Data

US 2012/0246651 A1  Sep. 27, 2012

(51) Int. Cl.
G06F 9/46 (2006.01)

(52) U.S. Cl.
USPC .......................................... 718/101; 709/203

(58) Field of Classification Search
None
See application file for complete search history.

(56) References Cited

U.S. PATENT DOCUMENTS

| | | | | |
|---|---|---|---|---|
| 5,640,319 A | * | 6/1997 | Beuning et al. | 700/2 |
| 6,058,389 A | * | 5/2000 | Chandra et al. | 1/1 |
| 6,529,932 B1 | * | 3/2003 | Dadiomov et al. | 718/101 |
| 7,143,128 B1 | * | 11/2006 | Baweja et al. | 709/201 |
| 2002/0143947 A1 | * | 10/2002 | Ishmael et al. | 709/226 |
| 2003/0212818 A1 | * | 11/2003 | Klein et al. | 709/238 |
| 2006/0031286 A1 | * | 2/2006 | Sagawa | 709/203 |
| 2006/0069717 A1 | * | 3/2006 | Mamou et al. | 709/203 |
| 2007/0011302 A1 | * | 1/2007 | Groner et al. | 709/224 |
| 2008/0228839 A1 | * | 9/2008 | Fung et al. | 707/202 |
| 2008/0306712 A1 | * | 12/2008 | Chen | 702/186 |
| 2009/0300405 A1 | * | 12/2009 | Little | 714/3 |
| 2010/0275217 A1 | * | 10/2010 | Cannata et al. | 719/316 |
| 2010/0287540 A1 | * | 11/2010 | Takai | 717/137 |
| 2010/0333111 A1 | * | 12/2010 | Kothamasu et al. | 719/313 |
| 2011/0154379 A1 | * | 6/2011 | Gamanho | 719/330 |

* cited by examiner

*Primary Examiner* — Emerson Puente
*Assistant Examiner* — Mehran Kamran
(74) *Attorney, Agent, or Firm* — Meyer IP Law Group

(57) ABSTRACT

A system and method can support batch job management in a distributed system using a queue system with a plurality of queues and one or more job management servers. The queue system can represent a life cycle for executing a job by a job execution component, with each queue in the queue system adapted to receive one or more messages that represent a job status in the life cycle for executing the job. The one or more job management servers in the distributed system can direct the job execution component to execute the job, with each job management server monitoring one or more queues in the queue system, and performing at least one operation on the one or more messages in the queue system corresponding to a change of a job status for executing the job.

20 Claims, 8 Drawing Sheets

| ID | Name | Class | Status | Submit Time | Running Step Time | Machine | Result |
|---|---|---|---|---|---|---|---|
| 0000476 | job0 | 9 | WAITING | Nov 11 21:31:52 | XXX | 0 | OK |
| 0000475 | job0 | 9 | WAITING | Nov 11 21:31:50 | | 0 | OK |
| 0000474 | job9 | 9 | WAITING | Nov 11 21:31:47 | | 0 | OK |
| 0000473 | job9 | 9 | WAITING | Nov 11 21:31:46 | | 0 | OK |
| 0000472 | job0 | 9 | EXECUTING | Nov 11 21:31:41 | | 0 bjax2 | OK |
| 0000471 | job0 | 9 | DONE | Nov 11 21:31:39 | | 104 bjax2 | OK |
| 0000467 | JOBNAME C | | DONE | Nov 11 21:19:03 | | 104 bjax2 | OK |
| 0000466 | JOBNAME C | | DONE | Nov 11 21:18:56 | | 104 bjax2 | OK |
| 0000470 | JOBA | A | WAITING | Nov 11 21:31:33 | | 0 | OK |
| 0000469 | JOBA | A | WAITING | Nov 11 21:31:32 | | 0 | OK |
| 0000468 | JOBA | A | EXECUTING | Nov 11 21:31:30 | | 0 bjax2 | OK |
| 0000462 | JOBNAME B | | DONE | Nov 11 21:18:39 | | 103 bjax2 | OK |
| 0000461 | JOBNAME B | | DONE | Nov 11 21:18:37 | | 103 bjax2 | OK |
| 0000460 | JOBNAME B | | DONE | Nov 11 21:18:36 | | 105 bjax2 | OK | total:14
success:14

Figure 8

SYSTEM AND METHOD FOR SUPPORTING BATCH JOB MANAGEMENT IN A DISTRIBUTED TRANSACTION SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention generally relates to transaction servers, and distributed transactional services, and particularly to supporting batch job management in a distributed transaction server or transactional service system.

BACKGROUND

Generally, a distributed transaction server, or a transactional services system, such as a Tuxedo server, can be considered a middleware platform that can be used to manage distributed transaction processing in a distributed computing environment. As an application server, the distributed transaction server can provide features such as containers to host business logic written in different programming languages. Additionally, the distributed transactional server can provide facilities to transparently distribute user applications across a cluster of machines, and to route and load balance requests both across different machines within a cluster, and across different servers within a machine. This in turn provides extremely high availability. These are the general types of environment that embodiments of the invention are intended to be used within.

SUMMARY

In accordance with an embodiment, a system and method can support batch job management in a distributed system using a queue system with a plurality of queues and one or more job management servers. The queue system can represent a life cycle for executing a job by a job execution component, with each queue in the queue system adapted to receive one or more messages that represent a job status in the life cycle for executing the job. The one or more job management servers in the distributed system can direct the job execution component to execute the job, with each job management server monitoring one or more queues in the queue system, and performing at least one operation on the one or more messages in the queue system corresponding to a change of a job status for executing the job.

BRIEF DESCRIPTION OF THE FIGURES

FIG. 8 illustrates an exemplary job status report in accordance with an embodiment.

DETAILED DESCRIPTION

The present invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

Additionally, the description of various embodiments of the invention provided herein use a Tuxedo distributed transaction server or transactional services system environment as an illustrative example of a distributed transaction service environment. It will be apparent to those skilled in the art that other types of distributed transaction service environments can be used without limitation.

In accordance with an embodiment, a batch job system is an application model often used in a mainframe computing environment. Generally, the batch job application needs to be migrated smoothly from mainframe to a distributed system to not only reduce cost for the users, but also improve the IT infrastructure efficiency, manageability and openness.

In accordance with an embodiment, the system can reduce the complexity of migrating a mainframe batch application to a distributed system. The distributed system can provide a transactional queue, along with high availability and reliability capabilities. The distributed system can emulate the job entry subsystem (JES) features in a mainframe computing environment, such as job life cycle management and monitoring, job submission/scheduling system design.

Figure 1:
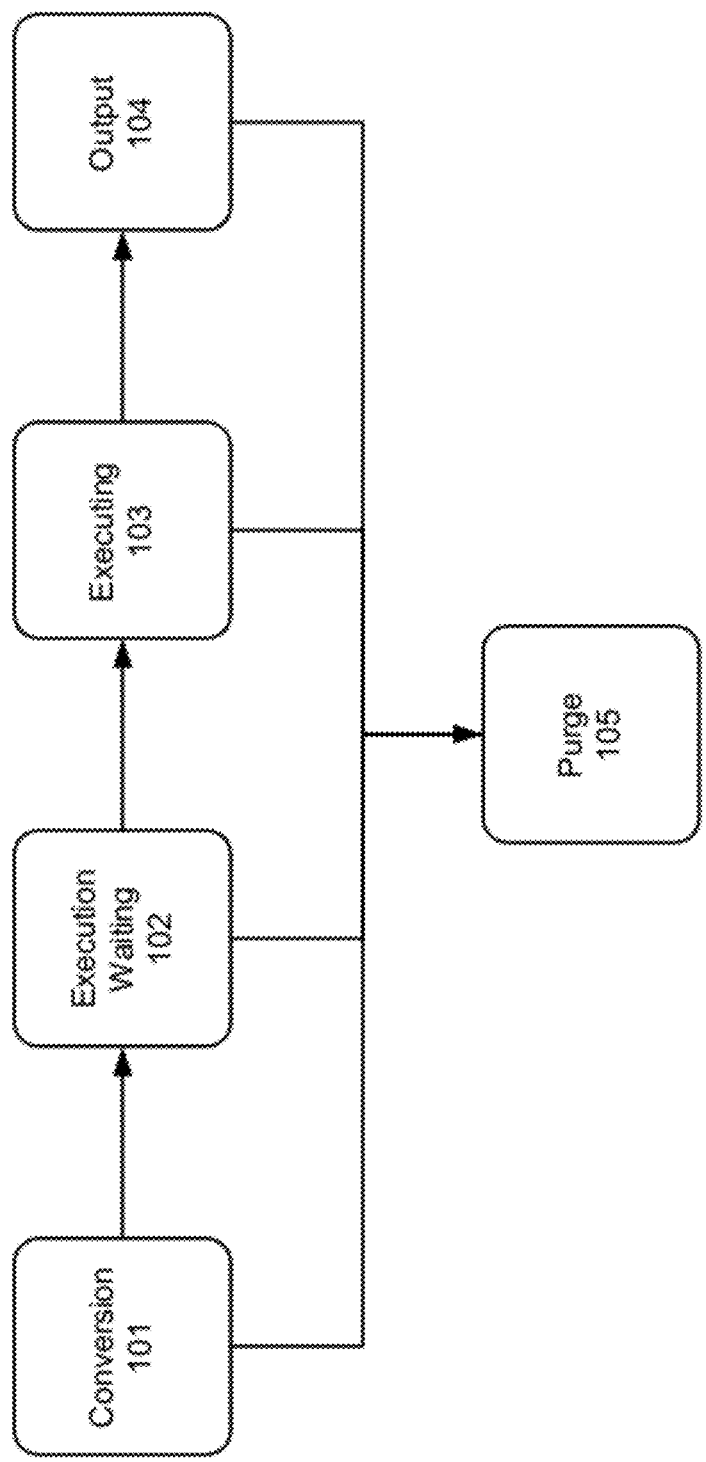
FIG. 1 illustrates an exemplary view of a life cycle for executing a job in accordance with an embodiment.

FIG. 1 illustrates an exemplary view of a life cycle for executing a job in accordance with an embodiment. As shown in FIG. 1, different states can exist in a life cycle of for executing a job in a distributed system. In accordance with an embodiment, the job can be in a conversion state 101 when it is first submitted to the distributed system. When the job is ready to be executed, the state of the job is changed from the conversion state to an execution waiting state 102. Furthermore, when the job is being executed, the state of the job is changed from the execution waiting state to an executing state 103. Finally, when the job is successfully executed by the distributed system, the state of the job is changed from the executing state to an output state 104. Additionally, there can be a purge state 105 for the job in the life cycle, which indicates that the job is ready to be purged from the distributed system.

Figure 2:
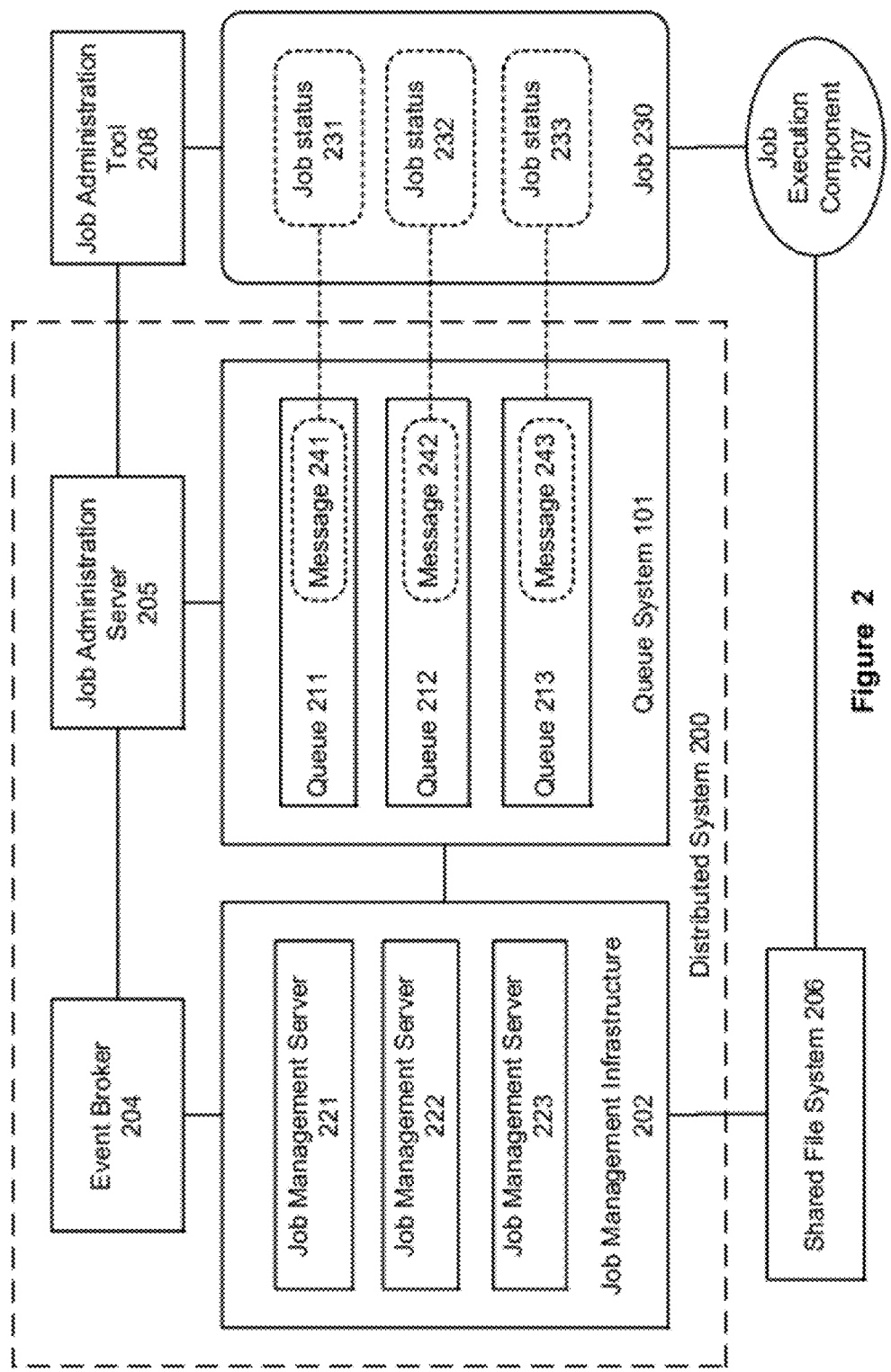
FIG. 2 illustrates an exemplary view of a distributed transactional service system that supports batch job management in accordance with an embodiment.

FIG. 2 illustrates an exemplary view of a distributed transactional service system that supports session management in accordance with an embodiment. As shown in FIG. 2, a job administration tool 208 can submit a request for executing a job 230 to a job administration server 205 in a distributed system 200. The distributed system 200 includes a queue system 100 with a plurality of queues 211, 212, and 213, and one or more job management servers 221, 222, and 223. After receiving the request, the job administration server can initiate a job message and put the job message in the queue system.

In accordance with an embodiment, the queue system can represent a life cycle for executing the job by a job execution component 207, with each queue in the queue system adapted to receive one or more messages that represent a job status in a life cycle for executing a job. In accordance with an embodiment, there can be a one-to-one relationship between a message 241, 242, or 243 in a queue and a job status 231, 232, or 233 in a life cycle for executing a job.

One exemplary transactional queue system is the Tuxedo/Q component, which allows messages to be queued to persistent storage (disk) or to non-persistent storage (memory) for later processing or retrieval. The Tuxedo Application-to-Transaction Monitor Interface (ATMI) can provide functions that allow messages to be added to, or read from, queues. Reply messages and error messages can be queued for later return to client programs. An administrative command interpreter can be provided for creating, listing, and modifying the queues. Servers can be provided to accept requests to enqueue and dequeue messages, to forward messages from the queue for processing, and to manage the transactions that involve the queues.

In accordance with an embodiment, The one or more job management servers in the distributed system can direct the job execution component to execute the job. Each said job management server can monitor one or more queues in the queue system, and performs at least one operation on the one or more messages in the queue system corresponding to a change of a job status for executing the job.

In accordance with an embodiment, the job management servers can perform a dequeue operation in order to pick up a job message from a first queue in the queue system, and then perform an enqueue operation in order to add the job message into a second queue in the queue system. In an embodiment, all enqueue operations and dequeue operations in the queue system can be transactional, including the moving of a job message from one queue to another queue.

In accordance with an embodiment, the job management servers can interact with the job execution component through a shared file system 106, and direct the job execution component to execute the job.

In accordance with an embodiment, an event broker 204 can monitor each one of the one or more batch job management servers directly and publish an event that indicates a change of a job status through the job administration server.

Figure 3:
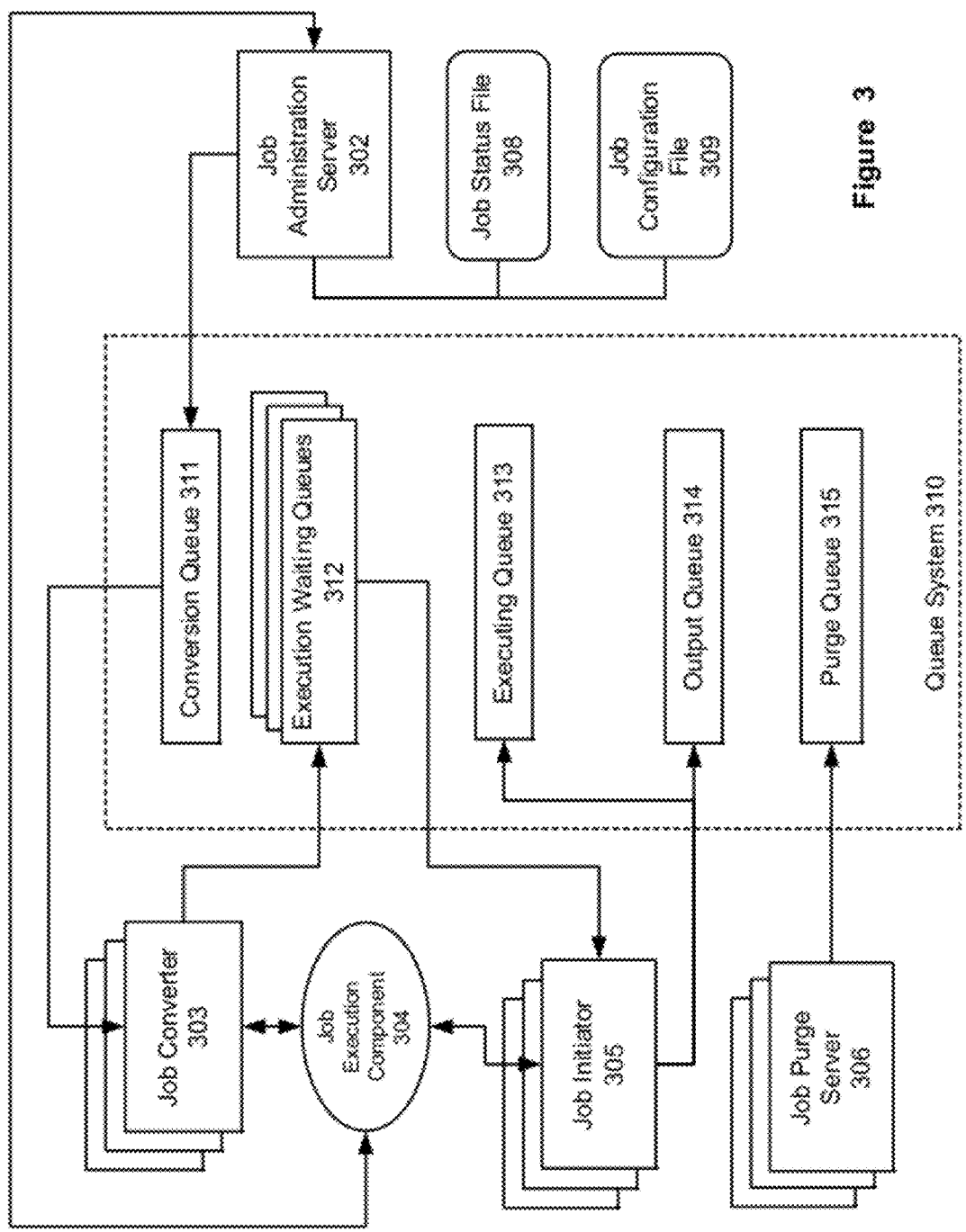
FIG. 3 illustrates an exemplary view of a batch job management infrastructure that manages a job execution in accordance with an embodiment.

FIG. 3 illustrates an exemplary view of a batch job management infrastructure that manages a job execution in accordance with an embodiment. As shown in FIG. 3, a queue system 310 contains a conversion queue 311, one or more execution waiting queues 312, an executing queue 313, an output queue 314, and a purge queue 315. In accordance with an embodiment, each queue in the queue system is adapted to handle a job message that represents a particular state of a job status for executing a job in a job life cycle. Additionally, there can also be other internal used queues for job logic processing.

The batch job management infrastructure includes a job administration server 302 and different job management servers: such as a job converter 303, a job initiator 305, and a job purge server 306.

In accordance with an embodiment, the job administration server reads configuration information in a job configuration file 309 when it is starting up. Once the job administration server receives a request to submit a job from a user, the job administration server operates to invoke the job execution component 304 to get information on the job and send a new job message to a conversion queue in the queue system. The job message indicates that the job represent by the job message is ready for conversion.

In accordance with an embodiment, a job converter can monitor a conversion queue in the queue system. There can be only one conversion queue in the system. The job messages in the conversion queue can be processed in first-in-first-out (FIFO) order. Multiple job converters can be configured in a distributed system taking advantage of the high availability and reliability capabilities provided by the distributed system. When a job converter detects the new job message in the conversion queue, the job converter can pick up the job message from the conversion queue and directs the job execution component to convert the job from an input format into a format that is suitable for the job execution component.

For example, in accordance with an embodiment, when used in a Tuxedo environment, the system can provide a set of high-level functions that simplify script syntax and enable easily readable and maintainable Korn shell scripts. Using these functions, the Tuxedo system can translate complete mainframe job input file, such as a z/OS job control language (JCL) files that describes main jobs, PROCs, INCLUDEs, etc., into complete Unix/Linux shell scripts using the Korn shell (ksh) syntax. A function resulting from JCL conversion can be called directly from a Korn shell. The Tuxedo system can normalize the Korn shell script formats by proposing a script model where the different execution phases of a job can be clearly identified. Also, when these functions are used together, the execution of one function can be conditional based on the return code produced by a preceding function.

After the conversion, the job converter can move the job message to an execution waiting queue based on job class. In accordance with an embodiment, there can be more than one execution waiting queues in the queue system, and each execution waiting queue can be associated with a job class category. A job message can be stored in any of the execution waiting queue.

In accordance with an embodiment, each job class represents one type of job, and each job class can be mapped to one execution waiting queue. For example, when the Tuxedo system is used, each job can be mapped to one Tuxedo/Q message in FML32 buffer. Additionally, similarly to a mainframe batch job, a job in the distributed system can have 36 classes (A-Z and 0-9). Hence, there can be totally 36 execution waiting queues in the distributed transactional queue system. Each job also can have a priority, for example ranging from 0 to 15. The jobs can be scheduled based on the job class and priority. The job priority can be the base for the queue message priority, which also means that all the queues can be created with priority order.

In accordance with an embodiment, the job initiator is responsible for job execution. The job initiator operates to direct the job execution component to start a job and move the job message from an execution waiting queue into an executing queue. When a job is picked up from an execution waiting queue and successfully goes into a running state, the job message can be moved into the executing queue. There can only be one executing queue in the distributed system holding the running jobs. The executing queue can be created also with FIFO order.

In accordance with an embodiment, the distributed system can include multiple job initiators with each job initiator managing one job at a time. A job initiator does not pick up another job until the current job is finished. In accordance with an embodiment, the multiple job initiators support load-balancing and failover. The job initiator can monitor the execution of a job, move the job from an executing queue to an output queue once the job is finished, or cancel a job by invoke an operation on the batch job execution component. In accordance with an embodiment, there can be only one output queue in the distributed system. The output queue can also be created with FIFO order. Additionally, if the job initiator is killed or shutdown, the job is moved into a pending queue.

In accordance with an embodiment, when a job is to be purged, the job message can be moved to the purge queue. In accordance with an embodiment, there can be only one purge queue in the distributed system. The purge queue can be created with FIFO order. The job purge server listens to a purge queue and does cleanup work. Also, multiple job purge servers can be configured in the distributed system.

Additionally, the queue system can have a hold queue. When a job is in a hold state, a job message can be put into the hold queue first. Once the hold is released, the job message can be moved to conversion queue or waiting queue respectively.

In accordance with an embodiment, when the Tuxedo system is used, all these queues can be created in one queue space, for example, a QSPACE which names "JES2QSPACE." In Tuxedo, since/Q can be used for persistent storage, TMQUEUE server can be configure in UBBCONFIG and TMQFORWARD may not be deployed for queues in the system.

In accordance with an embodiment, the distributed system can create and maintain a job status file 308. This job status file, which can be a script file, contains information such as: current queue for this job; job time information; running location information; tuxedo machine index; and job initiator process ID. In an embodiment, the job status file can be created under a job directory, where the files generated by the job execution component are stored.

In accordance with an embodiment, a job status file can be used by the job management server to update the status of a job. The information in job status file can also be used for job management such as locating a job, since the job status file records current job state in the distributed system. In one example, the job status script file contains one line of text in the format of:

MACHINE=XXX, PID=XXX, QUEUE=XXX, STATUS=XXX, CLASS=XXX

In accordance with an embodiment, the job administration server can further provide a job management interface to a user, which includes utilities for job submission, control and monitoring. The job management interface can include a set of command line utilities and an intermediary server. User can work with a command line utilities and the server can accomplish most of the work. Multiple job administration servers can be configured in a distributed system.

Figure 4:
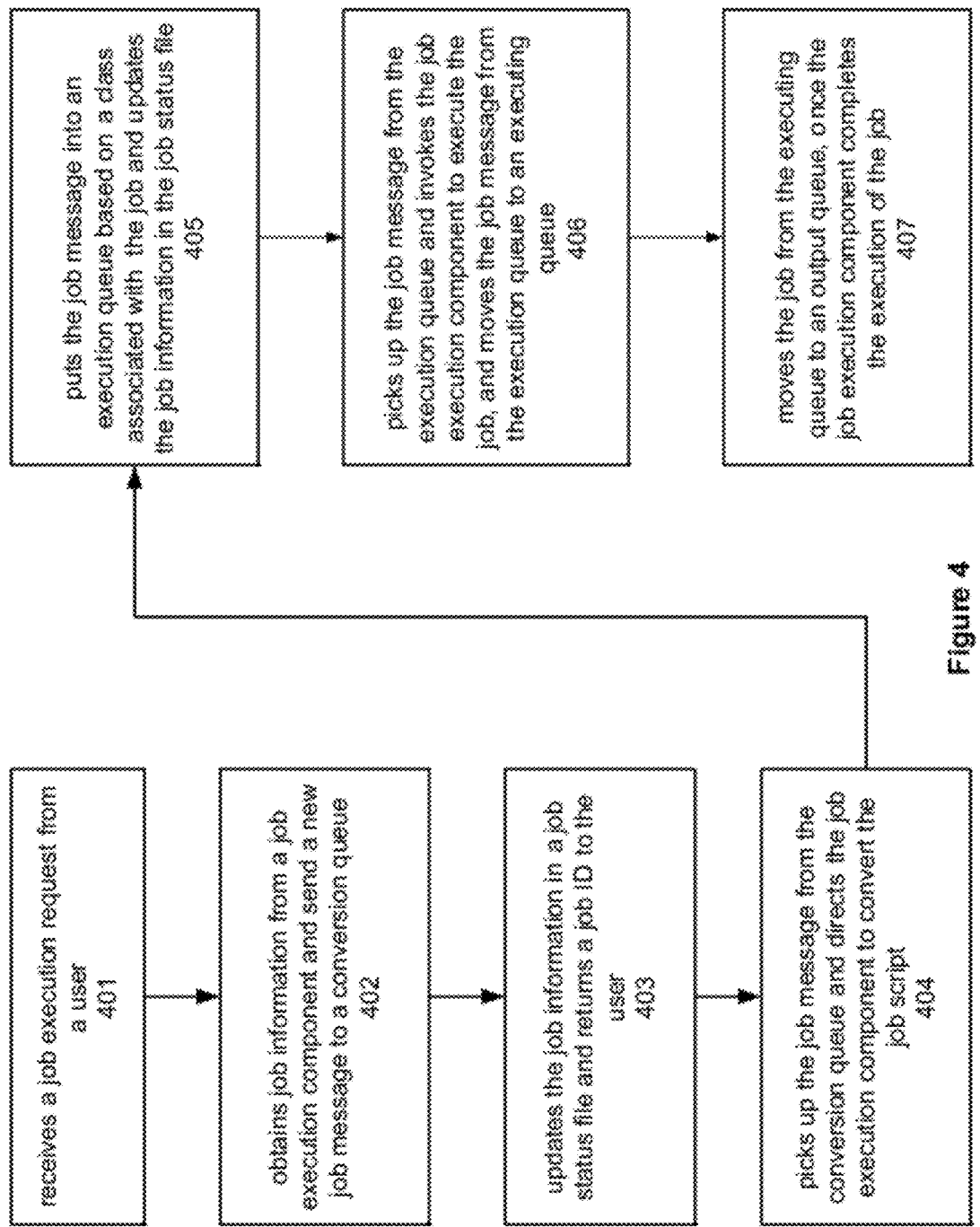
FIG. 4 illustrates an exemplary flow chart for executing a job in a distributed transactional service system in accordance with an embodiment.

FIG. 4 illustrates an exemplary flow chart for executing a job in a distributed transactional service system in accordance with an embodiment. As shown in FIG. 4, a user can use a job administration tool to submit a job execution request to a job administration server and wait for a reply, at step 401. The job administration server invokes a job execution component in order to obtain job information such as the job class, priority, the type of run and job name, then sends a new job message to a conversion queue in the queue system, at step 402. The job administration server then updates the job information in a job status file and returns a job ID to the user on the job administration tool, at step 403.

A job converter operates to pick up the job message from the conversion queue and call the job execution component to do the job script conversion work, at step 404. After the conversion work is done, the job converter puts the job message into an execution waiting queue based on a job class associated with the job and updates the job information in the job status file, at step 405.

The job initiator picks up the job message from the execution waiting queue and invokes the job execution component to run the job. The job initiator does not pick another job until the running job complete. At the same time, the job initiator can move the job message from the execution waiting queue to an executing queue, at step 406. Then, the job initiator updates the job status file to reflect the job information.

Once the job execution component completes the execution of the job and returns, the job initiator moves the job from the executing queue to an output queue, at step 407.

Figure 5:
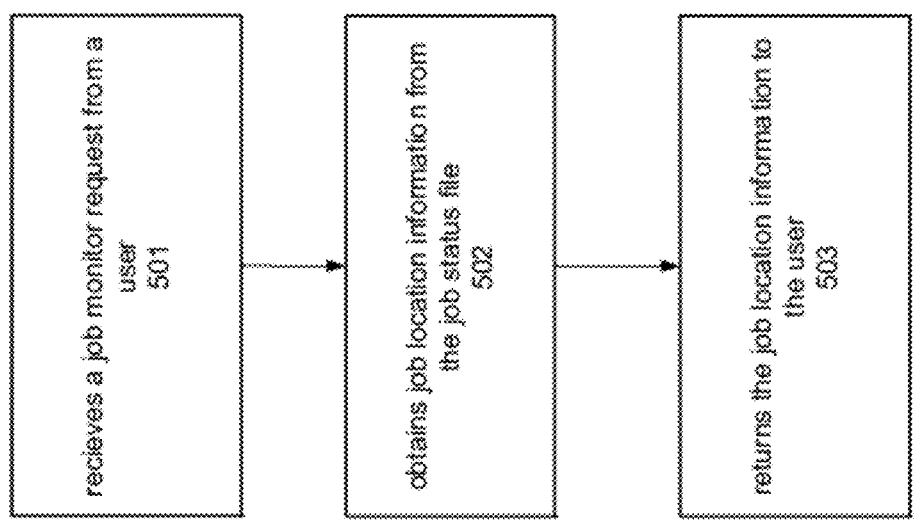
FIG. 5 illustrates an exemplary flow chart for monitoring a job in a distributed transactional service system in accordance with an embodiment.

FIG. 5 illustrates an exemplary flow chart for monitoring a job in a distributed transactional service system in accordance with an embodiment. As shown in FIG. 5, a user can use a job administration tool to submit a job monitoring request to a job administration server, at step 501. The job administration server can obtain job location information from the job status file for job control and monitoring, at step 502, and returns the job location information to the user, at step 503.

Figure 6:
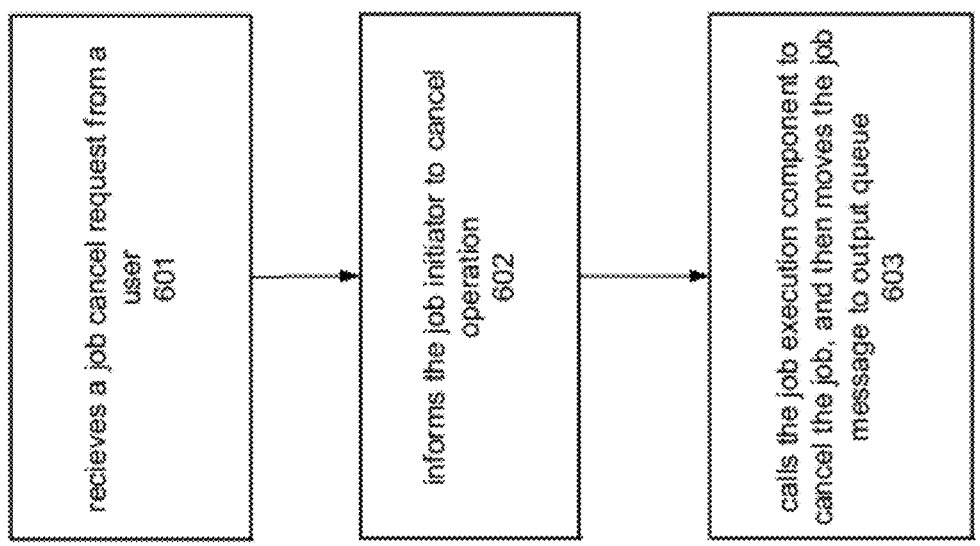
FIG. 6 illustrates an exemplary flow chart for cancelling a job in a distributed transactional service system in accordance with an embodiment.

FIG. 6 illustrates an exemplary flow chart for cancelling a job in a distributed transactional service system in accordance with an embodiment. As shown in FIG. 6, a user can use a job administration tool to submit a job control request to a job administration server, at step 501. The action can be at least one of a purge operation, a hold operation, a release operation, and a cancel operation. The job administration server executes the job control and display actions accordingly. For a running job, the job administration server can inform the job initiator to cancel operation, at step 503. The job initiator calls the job execution component to cancel the job, and then moves the job message to output queue, at step 503.

Figure 7:
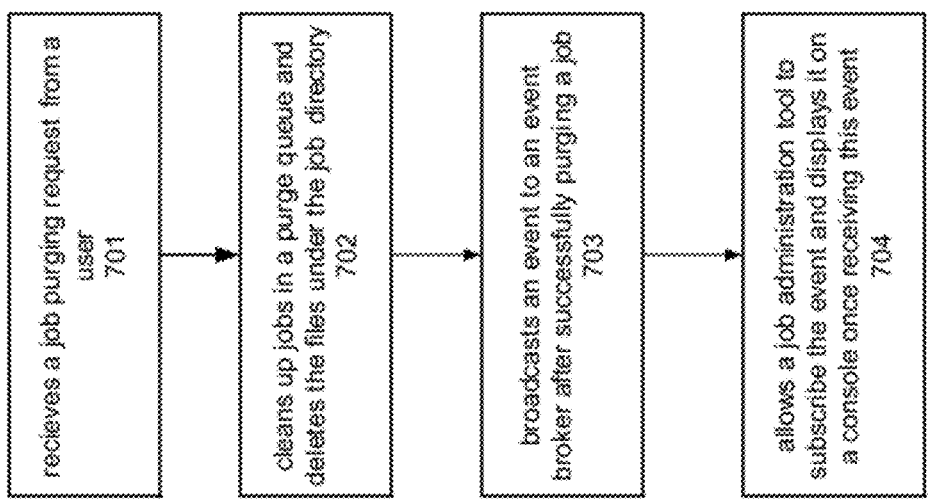
FIG. 7 illustrates an exemplary flow chart for purging a job in a distributed transactional service system in accordance with an embodiment.

FIG. 7 illustrates an exemplary flow chart for purging a job in a distributed transactional service system in accordance with an embodiment. As shown in FIG. 7, a user can use a job administration tool to submit a job purge request to a job administration server, at step 701. The job purge server cleans up jobs in a purge queue and deletes the files under the job directory, at step 702. Then, the job purge server broadcasts an event to the event broker when the job purge server successfully purges the job, at step 703. The job administration tool can subscribe to the event and displays the event on a console once it receives this event, at step 704. If error happens at input/conversion/executing phases, the job can be moved to output queue.

Representing a Job Using a/Q Message in Tuxedo System

In accordance with an embodiment, the Tuxedo system can use a distributed transactional message, such as a/Q message, to represent a job. The job message can be stored persistently in the distributed transactional queue during the whole life of the job until it is purged from the job system. The system can define the job message in FML32 buffer with multiple fields.

In accordance with an embodiment, the job message can include a unique job identifier of a job, for example a JES2_JOB_ID parameter in a string format. In an embodiment, the distributed system guarantees a unique value for each job in a server domain level. Also, the job message can include a name of a job, for example a JES2_JOB_NAME parameter in a string format, which is supplied in JCL and extracted by the job execution component.

In accordance with an embodiment, the job message can include a class of the job, for example a JES2_JOB_CLASS parameter in a string format, which can be one character in the scope is [A-Z] or [0-9]. The job message can also include a job priority, for example a JES2_JOB_PRTY parameter in a short integer format, which can be in the range of [0-15]. The job message can also include a message class of the job, for example a JES2_JOB_MSGCLASS parameter in a string format, which has same value range as job class, and an absolute ksh script path name, for example a JES2_JOB_SCRIPT parameter in a string format.

In accordance with an embodiment, the job message can include a running type of the job, for example a JES2_JOB_TYPRUN parameter in a string format. Such a parameter can have different values such as: COPY, JCLHOLD, SCAN. When the JES2_JOB_TYPRUN parameter has a value of COPY, the running type of the job is to copy the input script directly to JESROOT/JOBID/SYSOUT without conversion or execution. When the JES2_JOB_TYPRUN parameter has a value of JCLHOLD, the running type of the job is to hold the job in HOLD state until release operation for conversion processing. When the JES2_JOB_TYPRUN parameter has a value of HOLD, the running type of the job is to hold the job from be processed conversion until the operator releases it. When the JES2_JOB_TYPRUN parameter has a value of SCAN, the running type of the job is to perform conversion only without execution.

In accordance with an embodiment, the job message can include a timestamp in second when the job is submitted, for example a JES2_JOB_SUBMITTIME parameter in a long integer format. The job message can also include a finish timestamp in second, for example a JES2_JOB_ENDTIME parameter in a long integer format.

In accordance with an embodiment, the job message can include different option strings, for example a JES2_JOB_EJROPTION parameter for the job execution component in a string format and a JES2_JOB_SHELLOPTION parameter for the ksh script in a string format.

In accordance with an embodiment, the job message can include a job status code, for example a JES2_JOB_STATUS parameter in a long integer format. There can be different value acceptable for the JES2_JOB_STATUS parameter: JES2_EXEC (0), which indicates that the job is running; JES2_CVT (1), which indicates that the job is waiting conversion; JES2_HOLD (2) which indicates that the job is in hold state; JES2_ECVT (3), which indicates that the job has a converting error; JES2_WAIT (4), which indicates that the job is waiting for execution; JES_SUCC (5), which indicates that the job is finished successfully; JES_EEXEC (6), which indicates that the execution job is failed; JES_ESYS (7), which indicates a system error.

In accordance with an embodiment, the job message can include a current job execution step, for example a JES2_JOB_CURRENT parameter in a string format. Also, the job message can include an owner of the job, for example a JES2_JOB_OWNER parameter in a string format, since an owner is required when Tuxedo application is associated with user authorization security level.

In accordance with an embodiment, the job administration tool can provide the user with other utility tools, such as a command to display the existing jobs in the distributed system.

FIG. 8 illustrates an exemplary job status report in accordance with an embodiment. As shown in FIG. 8, different status can be shown in a screen printout format 800. For example, a EXECUTING status indicates that a job is in the executing queue and is running; a CONVING status indicates that a job stays in the conversion queue and waiting for conversion; a WAITING status indicates that a job stays in the execution waiting queues and waiting for execution; a DONE status indicates that a job stays in the output queue and finished successfully; a FAIL status indicates that a job stays in output queue but failed; a HOLD_WAITING status indicates that a JOB is in hold state but after conversion; a HOLD_CONVING status indicates that a job is in hold state but without conversion; and a INDOUBT status indicates that a job is in doubt state due to its initiator restarted.

In accordance with an embodiment, there can be a step report which is a string that indicates current job step. The step report can be only applicable to running jobs. There can also be a machine report, which indicates the machine name of the job running on, and the running time and submitting time of the job.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical discs, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system to support job management of a plurality of jobs described in job script files in an initial language, comprising:
   a distributed system comprising a job execution component operating on a plurality of microprocessors;
   a job administration server wherein the job administration server is operative to receive each job script file and, in response to each job script file, create a separate lob message associated with each job script file;
   a queue system in the distributed system wherein the queue system includes at least a conversion queue, an execution-waiting queue, and an executing queue;
   a job converter in the distributed system that monitors the conversion queue, where the job converter is operative to select a job message from the conversion queue,
      direct the job execution component to convert the job script file associated with said job message into a converted job script file in a conversion script language different than the initial language, and then move said job message to the execution-waiting queue; and a job initiator in the distributed system that monitors the execution-waiting queue, wherein the job initiator is operative to select a job message from the execution-waiting queue, direct the job execution component to execute a converted job script file associated with said job message, and move said job message from the execution-waiting queue into the executing queue.

2. The system according to claim 1, wherein:
each queue in the queue system supports an enqueue operation and a dequeue operation.

3. The system according to claim 1, wherein:
the queue system further comprises an output queue; and
wherein the job initiator is further operative to
monitor the execution of the converted job script file associated with said job message, and
move said job message from the executing-queue to the output queue, once execution of said converted job script file is finished.

4. The system according to claim 1, wherein the initial language is a mainframe job input language and wherein the conversion script language is a Unix/Linux script language.

5. The system according to claim 1, further comprising:
a job administration server that operates to receive a request to submit a job from a user, wherein the job administration server operates to invoke the job execution component to get information on the job and send a new job message to the conversion queue in the queue system.

6. The system according to claim 1, comprising a plurality of execution-waiting queues wherein each execution-waiting queue is associated with a single job class category.

7. The system according to claim 1, wherein:
the job initiator is further operative to cancel a job by invoking an operation on execution component.

8. The system according to claim 1, wherein:
when the job initiator is killed or shutdown, any job message associated with the job initiator is moved into a pending queue.

9. The system according to claim 1, comprising a plurality of job initiators, wherein each job initiator manages one job at a time.

10. The system according to claim 9, wherein:
the plurality of job initiators support load-balancing and failover.

11. The system according to claim 1, wherein:
the queue system further comprises a purge queue; and
the system further comprises a job purge server that listens to said purge queue and does cleanup work.

12. The system according to claim 1, wherein:
the job converter and the job initiator communicate with the job execution component through a shared file system.

13. The system according to claim 1, further comprising:
an event system that monitors the job converter and the job initiator and publishes a job status.

14. A method for supporting management of execution of a plurality of job script files, in a distributed system having a job execution component operating on a plurality of microprocessors, comprising:
providing a queue system in said distributed system which includes at least a conversion queue, an execution-waiting queue, and an executing queue;
providing a job administration server wherein the job administration server is operative to receive each job script file and, in response to each job script file, create a separate job message associated with each job script file;
providing a job converter in said distributed system that monitors the conversion queue and performs
selecting a job message from a conversion queue,
allowing the job execution component to perform job script conversion work on the job script file associated with the selected job message, and
putting the selected job message in an execution waiting queue after the job script conversion work is done; and
providing a job initiator in said distributed system that monitors the execution-waiting queue and performs
selecting a job message from the execution-waiting queue,
invoking the job execution component to run the job script file associated with the selected job message, and
moving the selected job message from the execution-waiting queue into the executing queue.

15. A nontransitory machine readable medium having instructions stored thereon that when executed cause a distributed system having a job execution component operating on a plurality of microprocessors to perform steps comprising:
providing a queue system in said distributed system which includes at least a conversion queue, an execution-waiting queue, and an executing queue;
providing a job administration server wherein the job administration server is operative to receive each job script file and, in response to each job script file, create a separate job message associated with each job script file;
providing a job converter in said distributed system that monitors the conversion queue and performs
selecting a job message from a conversion queue,
allowing the job execution component to perform job script conversion work on the job script file associated with the selected job message, and
putting the selected job message in an execution waiting queue after the job script conversion work is done; and
providing a job initiator in said distributed system that monitors the execution-waiting queue and performs
selecting a job message from the execution-waiting queue,
invoking the job execution component to run the job script file associated with the selected job message, and
moving the selected job message from the execution-waiting queue into the executing queue.

16. The method of claim 14, wherein:
providing a queue system further comprises providing an output queue; and
providing a job initiator further comprises providing a job initiator operative to monitor the execution of the job script file associated with the selected job message, and move the selected job message from the executing queue to the output queue, once execution of said job script file is finished.

17. The method of claim 14, wherein said job script conversion work comprises translating the job script file associated with the selected job message from a mainframe job input language to a Unix/Linux script language.

18. The method of claim 14, further comprising:
receiving with said job administration server a request to submit a job from a user, invoking the job execution component to get information on the job, and sending a new job message associated with the job to the conversion queue in the queue system.

19. The method of claim 14, wherein providing a queue system further comprises providing a plurality of execution-waiting queues wherein each execution-waiting queue is associated with a single job class category.

20. The method of claim 14, wherein:

providing a job initiator further comprises providing a plurality of job initiators, wherein each job initiator manages one job at a time.

* * * * *

UNITED STATES PATENT AND TRADEMARK OFFICE
CERTIFICATE OF CORRECTION

| | | |
|---|---|---|
| PATENT NO. | : 8,789,058 B2 | Page 1 of 1 |
| APPLICATION NO. | : 13/072537 | |
| DATED | : July 22, 2014 | |
| INVENTOR(S) | : Li et al. | |

It is certified that error appears in the above-identified patent and that said Letters Patent is hereby corrected as shown below:

In the Drawings,

On sheet 5 of 8, in figure 5, under Reference Numeral 501, line 1, delete "recieves" and insert -- receives --, therefor.

On sheet 6 of 8, in figure 6, under Reference Numeral 601, line 1, delete "recieves" and insert -- receives --, therefor.

On sheet 7 of 8, in figure 7, under Reference Numeral 701, line 1, delete "recieves" and insert -- receives --, therefor.

Signed and Sealed this
Twenty-fourth Day of February, 2015

Michelle K. Lee
*Deputy Director of the United States Patent and Trademark Office*